United States Patent [19]

Peterson

[11] Patent Number: 5,497,927
[45] Date of Patent: Mar. 12, 1996

[54] BICYCLE RACK

[76] Inventor: Douglas C. Peterson, 360 Valley View Dr., Richfield, Utah 84701

[21] Appl. No.: 331,205

[22] Filed: Oct. 28, 1994

[51] Int. Cl.$^6$ ........................................ B60R 9/10
[52] U.S. Cl. ................ 224/519; 224/537; 224/534; 224/523; 224/924
[58] Field of Search ............. 224/42.03 B, 42.03 R, 224/42.03 A, 42.06, 42.07, 42.08, 488, 489, 512, 519, 521, 523, 531, 532, 533, 537, 924; 211/20

[56] References Cited

U.S. PATENT DOCUMENTS

| 4,015,718 | 4/1977 | Bernard | 211/20 |
|---|---|---|---|
| 4,629,104 | 12/1986 | Jacquet | 224/42.03 B |
| 4,702,401 | 10/1987 | Graber et al. | 224/924 |
| 4,815,638 | 3/1989 | Hutyra | 224/42.07 |
| 4,823,997 | 4/1989 | Krieger | 224/42.03 B |
| 4,875,608 | 10/1989 | Graber | 224/42.03 B |
| 4,938,399 | 7/1990 | Hull et al. | 224/42.03 A |
| 5,232,134 | 8/1993 | Allen | 224/42.03 B |
| 5,282,555 | 2/1994 | Meir et al. | 224/42.03 B |
| 5,377,886 | 1/1995 | Sickler | 224/42.03 B |
| 5,395,020 | 3/1995 | King | 224/42.03 A |

Primary Examiner—Henry J. Recla
Assistant Examiner—Gregory M. Vidovich
Attorney, Agent, or Firm—Terry M. Crellin

[57] ABSTRACT

A bicycle rack is cantilevered from a trailer hitch receiver of a transporting vehicle. The bicycle rack comprises an elongate, central support member having a first end that is received in the trailer hitch receiver, with the central support member extending rearwardly from the transporting vehicle. At least two elongate, transverse support members are attached to the central support member so that the transverse support members extend transversely across the rear end of the transporting vehicle. First and second, elongate, rigid, stabilizer members are connected between and securely affixed to the transverse support members at a position closely adjacent to the respective first and second ends of the transverse support members. Wheel support members are associated with one end of each of the transverse support members for retaining a back wheel of a bicycle at the one end of such transverse support member. A forward support mechanism is associated with a second end of each of the transverse support members for engaging a portion of a bicycle located forward of the back wheel of such bicycle to secure the forward end portion of the bicycle to the second end of the transverse support member and to maintain the bicycle in an upright position.

8 Claims, 6 Drawing Sheets

BICYCLE RACK

BACKGROUND OF THE INVENTION

1. Field of the Invention

The present invention relates generally to bicycle racks used in carrying bicycles on a vehicle. The invention, more specifically, relates to racks for carrying bicycles on the back end of a vehicle, including an automobile or a recreational vehicle such as a motor home. More particularly, the invention relates to racks for carrying bicycles wherein the rack is adapted to be detachably connected to a standard square tube trailer hitch receiver commonly used on automobiles and trucks.

2. State of the Art

Bicycling has become a very popular recreational activity. Various racks have been proposed and sold commercially for carrying bicycles on a variety of vehicles. The racks of the prior art are generally attached to the front end or rear end of a vehicle, such as an automobile or recreational vehicle. Racks for mounting bicycles on the top of automobiles are also common.

Those racks that are attached to the front end or rear end of a vehicle have generally been of the type shown in U.S. Pat. No. 4,676,414. The racks commonly support the bicycle or bicycles horizontally along the back end or front end of the transporting vehicle. The bicycles are hung from a hanger member, and especially when carrying a number of bicycles, such racks become unstable due to the leverage developed by the hanging bicycles. The weight of the bicycles and the torque developed thereby allow the bicycles to bounce up and down. This movement can harm the bicycles especially when the bicycles are stacked closely together so as to incur repeated contact with each other.

To alleviate the problems encountered with racks attached to the front and rear ends of vehicles, racks have been designed for the top of the vehicle. Several bicycles can be carried in a stable condition on top of the vehicle with the bicycles being securely held in spaced apart positions so that they do not make contact with each other. Roof top bicycle racks that incorporate fork mount members for securing the forks of the bicycle in stable, upright position on the roof of a vehicle have been widely accepted and used. The fork mount members hold the bicycle in an upright, stable position, and the bicycle is spaced from other bicycles carried on the roof of the vehicle so that no detrimental contact is made by adjacent bicycles. However, it is rather difficult to lift and mount a bicycle on the top of a vehicle as well as to demount the bicycle from the vehicle.

Attempts have been made to provide a platform type support extending from the back bumper of an automobile or truck, with one or more bicycles attached to the platform type support. Examples of such platform type carriers are shown in U.S. Pat. Nos. 4,813,584 and 5,067,640. The platform type devices are generally bulky and heavy. They are neither readily attached to the back end of the vehicle, nor are they readily removed from the vehicle. More detrimental, there has been no good way proposed of supporting two or more bicycles in stable, upright positions on the platform carriers. The bicycles are generally strapped on the platform carriers and are not held in stable, upright positions. Two or more bicycles are generally carried so as to rest against each other or against a post extending from the platform. This contact between the bicycles or between a bicycle and a post often results in undesirable damage to one or all of the bicycles being carried.

A carrier bracket is shown in U.S. Pat. No. 5,129,559 that is releasably mounted to the trailer hitch of a vehicle for carrying a bicycle or a wheel chair. The carrier bracket of U.S. Pat. No. 5,129,559 comprises a lateral channel that extends across the back end of a vehicle, and a vertical post extends upwardly from the channel at a point near the mid-point between the ends of the channel. Means are provided for receiving the front and back tires of a bicycle or wheel chair at opposite ends of the channel, and the frame of the bicycle or wheel chair is strapped to the vertical post. A bicycle is carried in relatively unstable condition, and the bicycle can be damaged by the vertical post and the resilient straps that are used to bind the bicycle to the vertical post.

A bicycle rack is shown in U.S. Pat. No. 5,025,932 that is somewhat similar to the carrier of U.S. Pat. No. 5,129,559. The rack of U.S. Pat. No. 5,025,932 has a lateral channel that extends across the back end of a vehicle, and a vertical post extends upwardly from the channel at a point near the mid-point between the end of the channel. However, instead of strapping a bicycle to the vertical post, the vertical post receives a crank arm of the front sprocket of the bicycle. The bicycle is held against tipping over by the crank arm. Unfortunately, the crank arm is not designed to take the force that it receives when the transporting vehicle hits a bump, and the crank arm is often damaged when the transporting vehicle travels over a rough road.

A search of the U.S. Patent art did not disclose any reference suggesting or teaching a bicycle rack that can be cantilevered from the receiver hitch of the transporting vehicle and which carries the bicycle in a horizontal, standing position along the back of the vehicle so that the rear wheel of the bicycle is supported by a wheel support member at one end of the transverse support member that extends across the back end of the vehicle, with the fork or frame of the bicycle being securely retained by appropriate mounting means located at or near the other end of the transverse support member.

OBJECTIVES AND BRIEF DESCRIPTION OF THE INVENTION

A principal objective of the invention is to provide a novel, bicycle rack that is cantilevered from the hitch receiver at the back end of a vehicle and provides support for one or more bicycles in a horizontal, standing position along the back of the vehicle.

A particular objective of the present invention is to provide such a rack in which a transverse support member extends transversely across the back end of the transporting vehicle, with means provided for stabilizing the transverse support member against pitching and yawing, and further with means for supporting a rear wheel of a bicycle at one end of the transverse support member and means for holding and retaining either the forks of the bicycle or the frame of the bicycle at the other end of the transverse support member.

The above objectives are achieved in accordance with the present invention by providing novel, unique bicycle rack that attaches firmly to the receiver hitch at the back end of a vehicle wherein the bicycle that is to be carried is stands upright and transversely across the back end of the vehicle. The bicycle stands upwardly lying in a plane that is substantially perpendicular to the longitudinal axis of the transporting vehicle. Multiple bicycles can be carried side-by-side along the back end of the vehicle, with the bicycles being held in a stable position so that they do not make unwanted contact with an adjacent bicycle, with the rack itself or with the transporting vehicle.

The bicycle rack of the present invention is cantilevered from a trailer hitch receiver of a transporting vehicle. One end of an elongate, central support member is received in the trailer hitch receiver so that the central support member extends rearwardly from the transporting vehicle.

In a preferred embodiment of the invention two or more elongate, transverse support members are attached to the central support member so that the transverse support members extend transversely across the rear end of the transporting vehicle. The transverse support members are securely attached to the central support member at spaced apart positions on the central support member. Each transverse support member is attached to the central support member at a position near the central portion of the transverse support member so that the opposite ends of the transverse support member extends from each longitudinal side of the central support member.

Rigid, stabilizer members are connected between and securely affixed to the transverse support members at a position closely adjacent to the respective ends of the transverse support members. The stabilizer members tie the transverse support members together in a stable, rectangular arrangement that eliminates detrimental pitching and yawing of the transverse support members.

A wheel support is associated with one end of each transverse support members for retaining a back wheel of a bicycle at the one end of the transverse support member. Forward support means are associated with a second end of each of the transverse support members for engaging either the fork or a portion of the forward triangle of the bicycle. The forward triangle of the bicycle includes the seat tube, the top tube and the down tube. The forward support means secures the forward end portion of the bicycle to the second end of the transverse support member and maintains the bicycle in a stable, upright position so that the bicycle will not come in contact with an adjacent bicycle.

Additional objects and features of the invention will become apparent from the following detailed description, taken together with the accompanying drawings.

THE DRAWINGS

Preferred embodiments of the present invention representing the best modes presently contemplated of carrying out the invention are illustrated in the accompanying drawings in which.

DETAILED DESCRIPTION OF THE ILLUSTRATED EMBODIMENTS

Referring to the drawings, several embodiments are illustrated in the various Figures of bicycle racks 10 in accordance with the present invention. The racks 10 of the present invention are all adapted to support one or more bicycles in an upright position along the back end of a vehicle. The several embodiments of the rack 10 as shown in the drawings are similar, and like parts of each embodiment will be identified with the same reference number. As used throughout the specification and claims, the word "vehicle" is meant to encompass motor vehicles including automobiles, trucks, vans and recreation vehicles such as motor homes.

The bicycle racks 10 of the present invention are adapted to be cantilevered from a trailer hitch receiver 12 of a transporting vehicle. The bicycle racks comprise an elongate, central support member 14 having a first end that is received in the trailer hitch receiver 12, with the central support member 14 extending rearwardly from the transporting vehicle.

In the preferred embodiments of the invention as illustrated in the drawings, the central support member 14 comprises an elongate lateral member 16 that extends backwardly a relatively short distance from the trailer hitch receiver 12 so that a trailing end of said lateral member 16 is positioned beyond the bumper of the transporting vehicle. The leading end of the lateral member 16 is sized to slide into the trailer hitch receiver 12, and a lock pin 15 is provided as is well known in the hitch art to retain the end of the lateral member 16 in the hitch receiver 12.

An elongate riser member 18 extends upwardly from the trailing end of the lateral member 16 a relatively short distance so that an upper end of the riser member 18 extends above a lower edge of the bumper of the transporting vehicle. An elongate second lateral member 20 extends backwardly from the upper end of the riser member 18 so that a longitudinal axis of the second lateral member 20 is substantially parallel to a longitudinal axis of the elongate lateral member 16. As illustrated, the lateral members 16 and 20, as well as the riser member 18 are preferably made of metal tubing that has a square or rectangular cross section.

The leading end of the lateral member 16 has a square cross section an is sized to fit snugly within the conventional trailer hitch receiver 12. It is to be recognized that if the hitch receiver 12 of the transporting vehicle is spaced sufficiently from the ground, the riser member 18 is not needed. In such cases, the central support member 14 could be formed by a single lateral member extending backwardly from the hitch receiver 12. However, on automobiles and mini vans, the hitch receiver is generally too close to the ground to provide adequate clearance for the lateral member to extend straight back from the hitch receiver, and it is then advantageous to use a riser 18 an second lateral member 20.

At least two elongate, transverse support members 22 are attached to the second lateral member 20 of the central support member 14 so that the transverse support members extend transversely across the rear end of the transporting vehicle. The transverse support members 22 are securely attached to the second lateral member 20 of the central support member 14 at spaced apart positions on the second lateral member 20 of the central support member 14.

The transverse support members 22 can be made of various elongate members including bars, rods, slats and tubing. Advantageously, the support members 22 are made of elongate channels that open upwardly so as to accept a wheel of a bicycle. The channels are preferably similar to elongate trays that are used on conventional roof top bicycle racks. Each transverse support member 22 is attached to the central support member 14 at a position in the central portion of the transverse support member 22, with the opposite ends of the transverse support members 22 extending on both sides of the central support member 14.

Means are provided for stabilizing the opposite ends of the transverse support members 22. A first, elongate, rigid, stabilizer member 26 is connected between and securely affixed to the transverse support members 22 at a position closely adjacent to the respective first ends of the transverse support members 22. A second, elongate, rigid stabilizer member 28 is connected between and securely affixed to the transverse support members 22 at a position closely adjacent to the respective second ends of the transverse support members 22.

A bicycle is to be carried by each of the transverse support members 22, and without any means of stabilizing the support members 22, the weight of the bicycle and the various forces that develop on the transverse support members 22 results in detrimental pitching and yawing of the transverse support members 22. The pitching and yawing motion allows the bicycles to move in an unstable motion that can result in damage occurring by one bicycle contacting another bicycle or by simply being damaged by the yawing and pitching motion of the transverse support members 22.

It has been unexpectedly found that the stabilizer members 26 and 28 tie the transverse support members 22 together in a stable, rectangular condition, and the undesirable yawing and pitching is essentially entirely eliminated. The positioning of two stabilizer members 26 and 28 at the opposite ends of the transverse support members 22 is all that is necessary, but additional stabilizer members could be connected between the transverse support members 22 if so desired.

Wheel support means is associated with one end of each of the transverse support members 22 for retaining a back wheel of a bicycle at the end of the transverse support member 22. As illustrated, a series of spaced apart openings 30 are provided in each of the transverse support members 22, and a strap 32 extends through a mated pair of openings 30 to encircle a back tire of a bicycle and securely hold the back tire of the bicycle within the upwardly opening channel of the transverse support member 22.

Forward support means is associated with the other end of each of the transverse support members for engaging a fork or a portion of the forward triangle of a bicycle to secure the forward portion of the bicycle to the second end of transverse support member 22 and to maintain the bicycle in an upright position. The forward support means preferably comprises a number of fork mount members 36 equal to the number of transverse support members 22, with a respective fork mount member 36 being attached to an end portion of each transverse support member 22. The fork mount members 36 are adapted to engage and securely hold a fork of a bicycle thereto after the front wheel of the bicycle has been removed from the fork of the bicycle as is well known in the art.

Each wheel support means, i.e., the openings 30 and straps 32, are located at an end of each transverse support member 22 which is opposite to an end having a fork member 36 so that a bicycle can be carried by each transverse support member 22 with the fork of the bicycle being retained by the fork mount member 36 at one end of the transverse support member 22, and with the back wheel retained at the other end of the transverse support member 22.

The fork mount members 36 provide a firm, stable support for bicycles to be carried by the rack 10. The fork mount members 36 retain the bicycles in a steady, stable, upright position. As mentioned previously, the stabilizer members 26 and 28 tie the transverse support members 22 together in a stable, rectangular configuration and prevent any yawing or pitching of the transverse support members 22. Thus, the bicycles are carried in a stable, upright position along the back end of the transporting vehicle, and the bicycles will not make contact with an adjacent bicycle or otherwise sustain damage even when being transported over a rough road.

Figure 1:
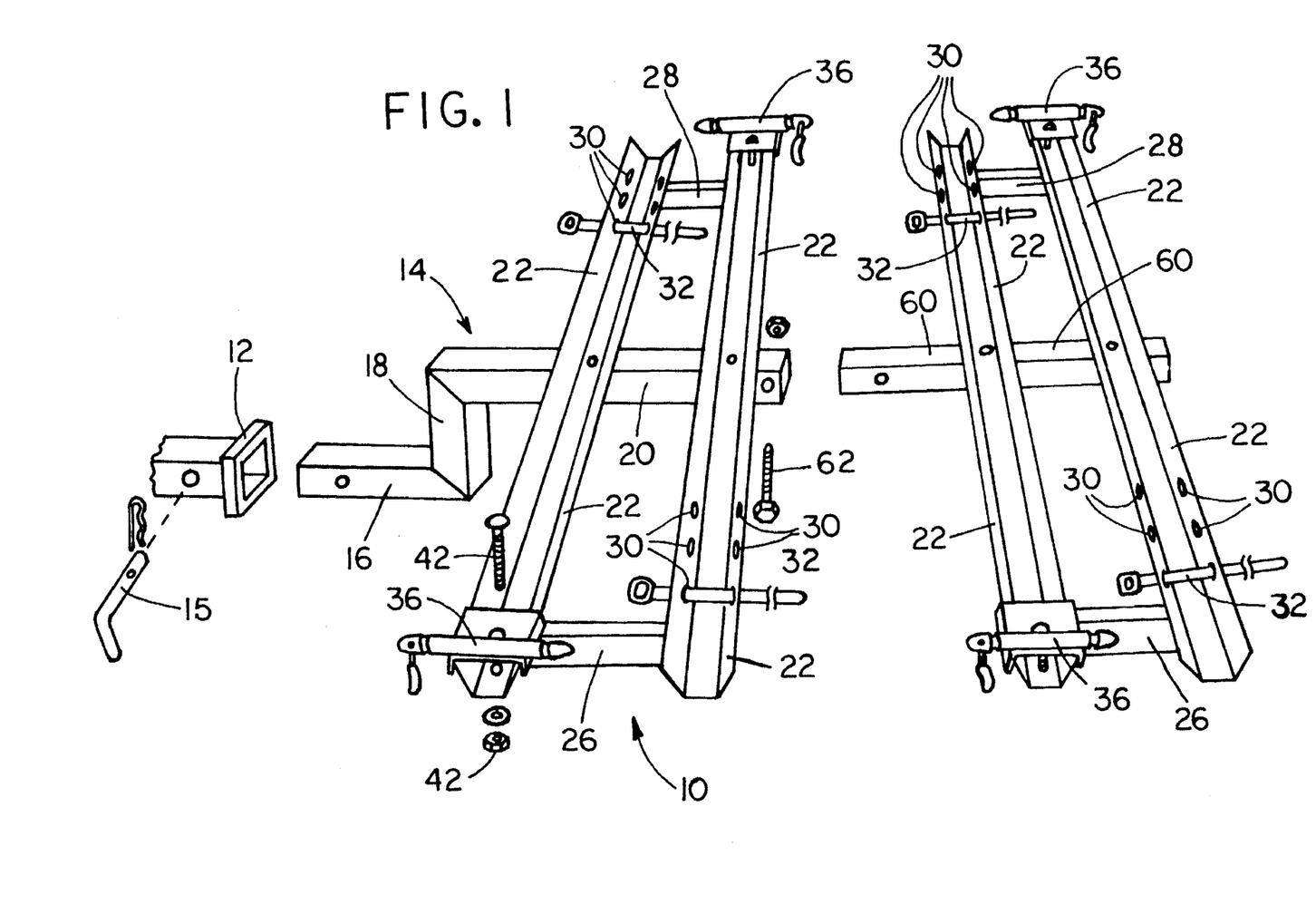
FIG. 1 is a pictorial view of a bicycle rack in accordance with the present invention that is to be attached to a trailer hitch receiver of a vehicle and has the capacity to carry two bicycles, with an extension unit also being shown that can be added to the bicycle rack so that two additional bicycles can be carried by the bicycle rack.
Figure 2:
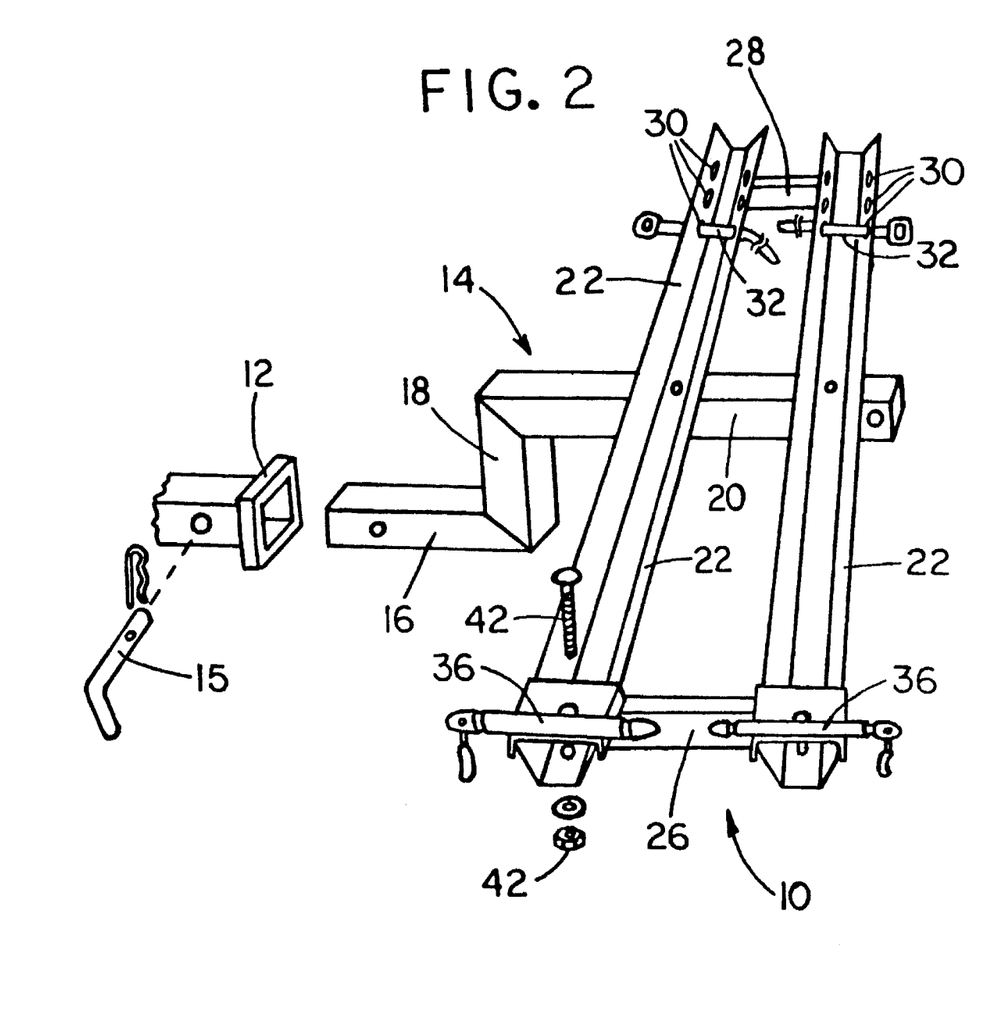
FIG. 2 is a view similar to that of FIG. 1 but showing a slightly modified embodiment of the bicycle rack in which the fork mount members are positioned on the same side of the rack.

As illustrated in FIG. 1, the fork mount members 36 are attached to alternating ends of adjacent transverse support members 22 so that when a fork mount member 36 is attached to the first end of a particular transverse support member 22, any transverse support member 22 that is adjacent to the particular transverse support member 22 will have a fork mount member 36 attached to its second end. Although it is preferable to alternate the fork mount members 36 as shown in FIG. 1, such an arrangement is not essential. As shown in FIG. 2, the fork mount members 36 can be located on the same side of the bicycle rack 10 instead of alternating between the sides of the rack 10.

As shown in FIG. 1, there are two transverse support members 22, with one fork mount member 36 attached to a first end of the first transverse support member 22, and with the other fork mount member 36 attached to a second end of the second transverse support member 22. As illustrated in FIG. 2, there are again two transverse support members 22, but both fork mount members 36 are attached to the same or first ends of the transverse support members 22.

To obtain as close a spacing as possible between adjacent bicycles, it is advantageous to stagger the bicycles with respect to each other by providing for adjustable attachment of the fork mount members 36 to the respective ends of the transverse support members 22 so that the point of attachment can be adjusted back and forth along the transverse support members 22 at selected spacings from the respective ends of the transverse support members 22.

Figure 5:
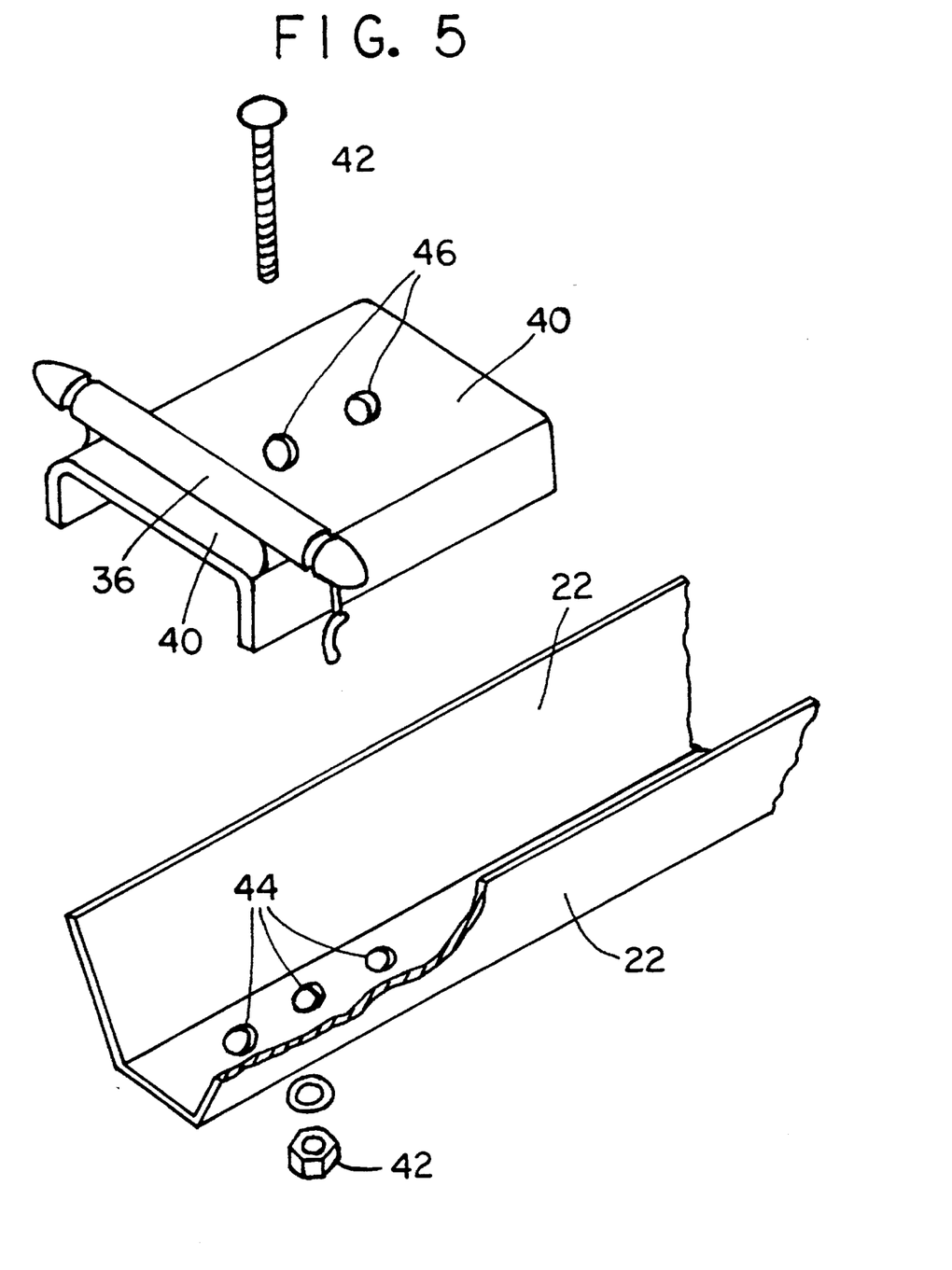
FIG. 5 is an exploded pictorial view of an end of a transverse support member of FIG. 1 showing one preferred means of supporting a fork mount member on the end of the transverse support member.

One such means for adjustable attachment of the fork mount member 36 to a respective end of a transverse support member 22 is shown in FIG. 5. As shown, the fork mount member 36 is attached to a sliding plate 40. The plate 40 is attached to the end of the transverse support member 22 by a bolt and nut attachment 42. As shown, the end of the transverse support member has two or three spaced apart openings 44 in which the bolt and nut attachment 42 can be received. The plate 40 can also have two spaced apart openings 46 for the bolt and nut attachment 42. Various spacings of the fork mount member 36 can be achieved by selective alignment of an opening 44 in the transverse support member 22 with an opening 46 in the plate 40.

The staggering of the bicycles will alleviate the handle bars of one bicycle contacting the rear wheel or the handle bars of an adjacent bicycle. Instead of lateral staggering by adjusting the position of the fork mount member 36 along the transverse support member 22, means can be provided for attaching the fork mount members 36 to the respective ends of the transverse support members 22 so that the fork mount member 36 can be positioned adjacent to the transverse support member or spaced upwardly by several inches from the transverse support member 22.

Figure 6:
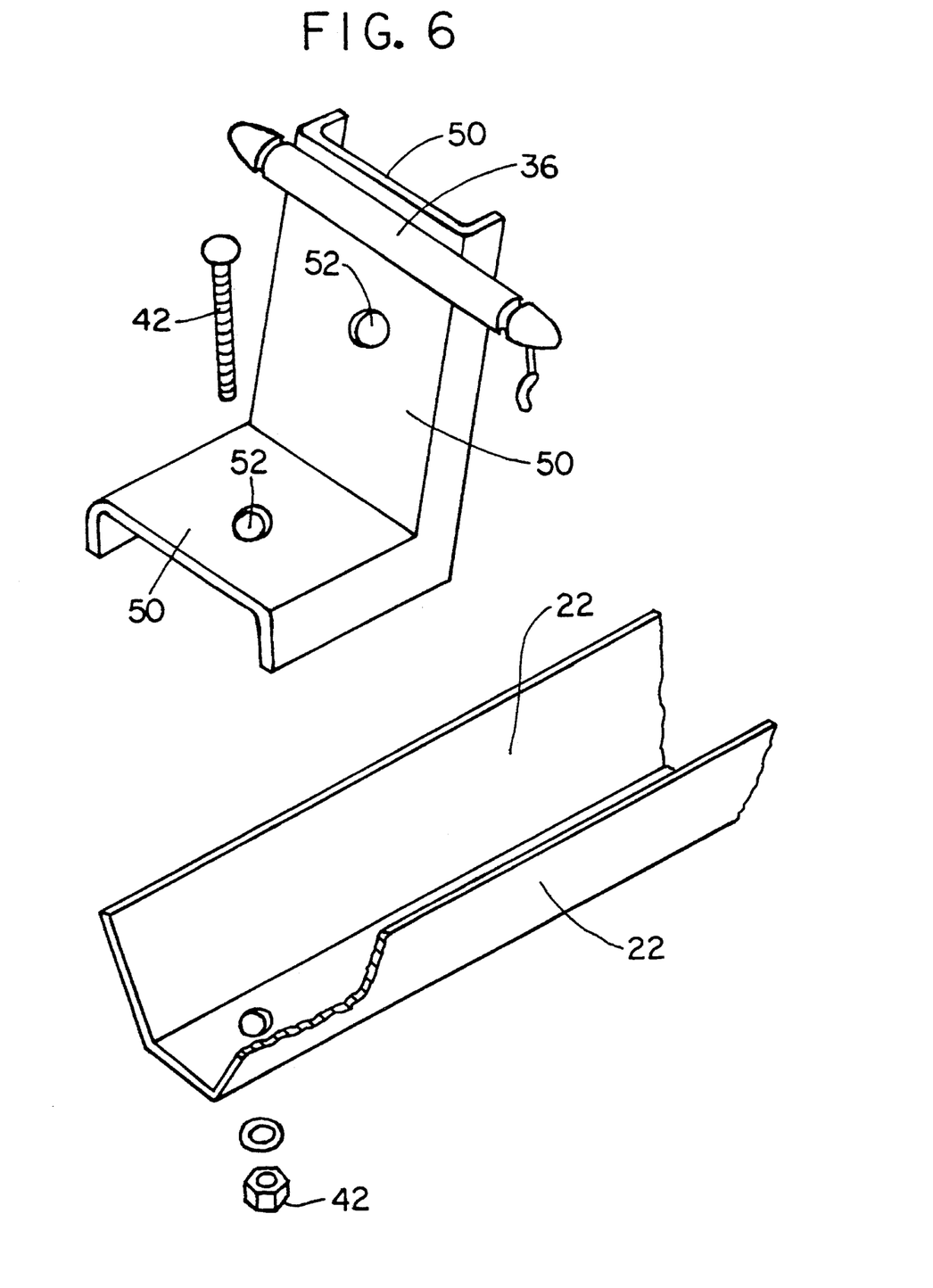
FIG. 6 is an exploded pictorial view similar to that of FIG. 5 showing another preferred means of supporting a fork mount member on the end of the transverse support member.

Such a means for vertical spacing of the fork mount member above the transverse support member 22 is shown in FIG. 6. As shown, there are two plates 50 that are arranged at an angle to each other. The fork mount member 36 is attached to a free end of one of the plates 50. An opening 52 is provided in each of the plates 50 for receiving a nut and bolt attachment 42. A corresponding opening is provided in the end of the transverse support member 36. When the plate 50 that does not have the fork mount member 36 attached thereto is bolted to the transverse support member 22, the fork mount member 36 is elevated above the transverse support member 22. When the plate 50 having the fork mount member attached thereto is bolted to the transverse support member 22, the fork mount member 36 is positioned closely adjacent to the transverse support member 22.

The basic rack 10 shown in FIG. 1 is capable of carrying two bicycles. It is advantageous to provide an add-on unit that will allow two additional bicycles to be carried on the rack. As shown in FIG. 1, the second lateral member 20 of the central support member 14 is hollow and has an open distal end facing rearwardly from the transporting vehicle. The add-on unit is adapted to engage the open distal end of the lateral member 20 of the central support member 14.

The add-on unit comprises an elongate extension support member 60 having first and second ends, with the first end of the elongate extension support member 60 being telescopically attached to the distal end of the central support member 14, i.e., to the open end of the lateral member 20, for sliding, telescopic engagement with the distal end of the central support member 14. The elongate extension support member 60 extends rearwardly from the distal open end of the lateral member 20 of the central support member 14.

Means are provided for releasably locking the first end of the extension support member 60 in its position in which it is attached telescopically to the distal end of the central support member 14. As illustrated, a lock pin 62 is provided to retain the first end of the extension support member 60 in the distal end of the lateral member 20 of the central support member 14.

A pair of additional transverse support members 22 are attached to the extension support member 60 so that the additional transverse support members 22 extend transversely across the rear end of the transporting vehicle. The additional transverse support members 22 are securely attached to the extension support member 60 at spaced apart positions on the extension support member, with each of the additional transverse support members 22 being attached to the extension support member 60 at a position in the central portion of the transverse support members 22.

A pair of rigid, stabilizer member 26 and 28 are connected between and securely affixed to the additional transverse support members 22 at a position closely adjacent to the respective first ends of the transverse support members 22. An additional pair of fork mount members are attached to the additional transverse support members 22 as well as wheel support means, such that the add on member resembles the basic rack 10 very closely. Two additional bicycles can be carried by the add on unit in the same manner as the bicycles that are carried on the basic rack 10.

Figure 3:
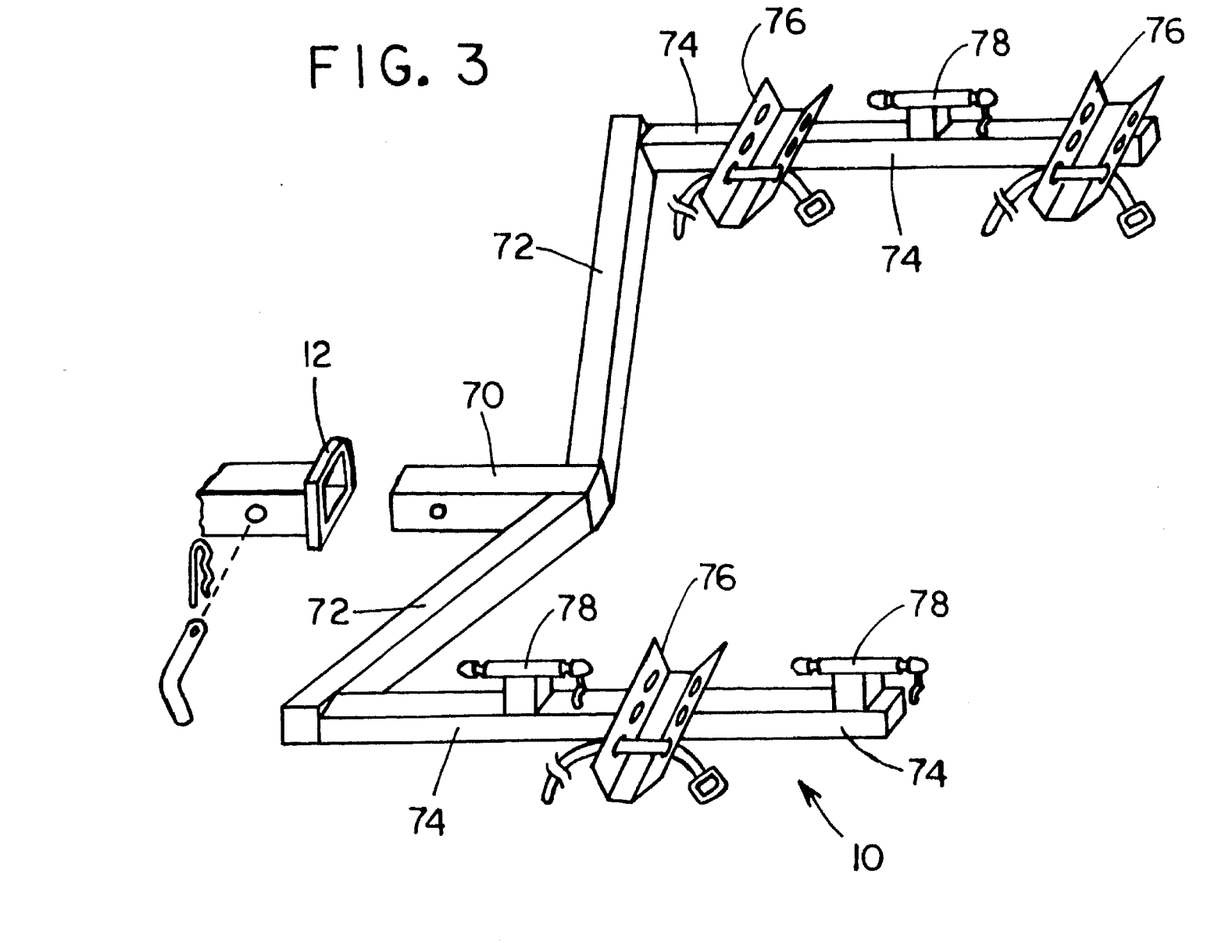
FIG. 3 is a pictorial view of another embodiment of a bicycle rack in accordance with the present invention.
Figure 4:
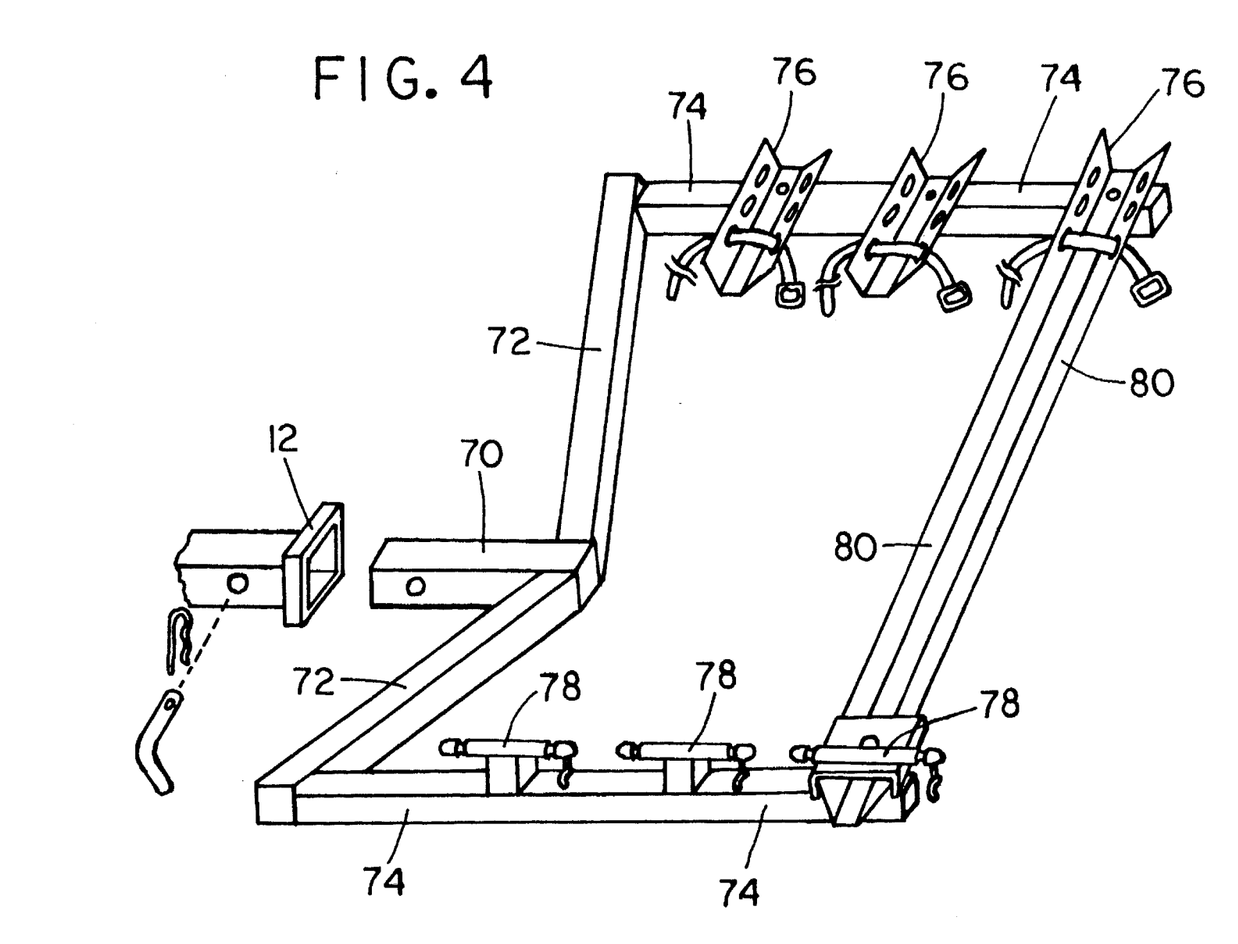
FIG. 4 is a pictorial view similar to that of FIG. 3 but showing a slightly modified embodiment in which the fork mount members are positioned on the same side of the rack.

A second preferred embodiment of a bicycle rack 10 in accordance with the present invention is shown in FIGS. 3 and 4. Again, the bicycle rack 10 is cantilevered from a trailer hitch receiver 12. The rack 10 shown in FIGS. 3 and 4 comprises an elongate lateral member 70 having a first end that is received in the trailer hitch receiver 12 so that the elongate lateral member 70 extends backwardly a relatively short distance from the trailer hitch receiver 12 to position the trailing end of the lateral member 70 beyond the bumper of the transporting vehicle.

A cross member 72 extends along the back end of the transporting vehicle from the trailing end of the lateral member 70. As illustrated, the cross member 72 has the shape of a broad "V", with the apex of the V-shaped member being attached to the trailing end of the lateral member 70, and with the two legs of the V-shaped member slanting upwardly from the apex.

Two spaced apart, elongate, lateral support members 74 extend backwardly substantially parallel with each other from the cross member 72. Preferably, the support members 74 are attached at the distal ends of the cross member 72. A wheel support member 76 is provided for retaining a back wheel of a bicycle to at least one of the support members 74. As illustrated, the wheel support member 76 is a short piece of channel that opens upwardly, with the channel being attached on one of the lateral support members 74.

A forward support means for engaging a fork or a portion of a forward triangle of the bicycle is provided for each wheel support member 76. The forward support means is preferably a fork mount member 78. The fork mount member 78 is mounted on a lateral support member 74 directly opposite a wheel support member 76 on the first lateral support member 74 so that a bicycle can be carried by the bicycle rack with a back wheel of the bicycle retained by the wheel support member 76 and the fork of the bicycle retained by the fork mount 78.

In the embodiment shown in FIG. 3, three bicycles can be carried, and the three fork mount members 78 alternate between the lateral support members 74. The first wheel support member 76 is attached to the first of the lateral members 74, and the first fork mount member 78 is paired with the first wheel support member 76 and is thus attached to the second lateral support member 74. A second and third pair of wheel support members 76 and fork mount members 78 are provided with the second fork mount member 78 being attached to the first lateral support member 74. The second fork mount member 78 is spaced from the first wheel support member 76 on the first lateral support member 74. The second wheel support member 76 is attached to the second lateral support member 74. The second wheel support member 76 is spaced from the first fork mount member 78 on the second lateral support member 74.

A third fork mount member 78 is attached to the second lateral support member 74. The third fork mount member 78 is spaced from the second wheel support member 76 on the second lateral support member 74. A third wheel support member 76 is attached to the first lateral support member 74. The third wheel support member 76 is spaced from the second fork mount member 78 on the second lateral support member 74.

The bicycle rack 10 shown in FIG. 4 is similar to that shown in FIG. 3, with two minor modifications. First, all the fork mount members 78 of the embodiment of FIG. 4 are attached to a common or first lateral support member 74, and all the wheel support members 76 are attached to the other or second lateral support member 74.

The second minor modification in the rack 10 of FIG. 4 is in the mode of attachment of at least one of the mated pairs of wheel support members 76 and fork mount members 78 to the lateral support members 74. As shown, at least one pair of wheel support members 76 and fork mount members 78 are mounted on an elongate transverse member 80. The transverse member 80 is attached near its opposite ends to the first and second lateral support members 74 so that the transverse member 80 extends from the first lateral support member 74 to the second lateral support member 74. The wheel support member 76 is attached to the transverse support member 80 near the first end of the transverse support member 80, and the fork mount member 78 is attached to the transverse support member 80 near the second end of the transverse support member 80. The transverse support member 80 provides stability to the lateral support members 74.

Although preferred embodiments of the bicycle rack of the present invention have been illustrated and described, it is to be understood that the present disclosure is made by way of example and that various other embodiments are possible without departing from the subject matter coming within the scope of the following claims, which subject matter is regarded as the invention.

I claim:

1. A bicycle rack adapted to be cantilevered from a trailer hitch receiver at a rear end of a transporting vehicle, said bicycle rack comprising:

an elongate, central support member having a first end that is adapted to be received in said trailer hitch receiver, with the central support member extending rearwardly from the transporting vehicle;

at least two elongate, transverse support members having respective first and second ends, said transverse support members being attached to said central support member so that the transverse support members extend substantially transversely of the central support member and substantially parallel to the rear end of said transporting vehicle, said transverse support members being securely attached to said central support member at spaced apart positions on said central support member, with each transverse support member being attached to said central support member at a position in the central portion of the transverse support member;

a first, elongate, rigid, stabilizer member connected between and securely affixed to each of said transverse support members at a position closely adjacent to respective first ends of said transverse support members;

a second, elongate, rigid, stabilizer member connected between and securely affixed to each of said transverse support members at a position closely adjacent to respective second ends of said transverse support members;

a number of fork mount members equal to the number of transverse support members, each of said fork mount members being adapted to engage and securely hold a fork of a bicycle thereto after the front wheel of the bicycle has been removed from the fork of the bicycle;

attachment means associated with each fork mount member for attaching the fork mount member to an end portion of a respective transverse support member, said attachment means being adapted to position each fork mount member in one of a first position adjacent to the respective transverse support member and a second position spaced upwardly by a distance greater than the first position from the respective transverse support member; and means associated with each transverse support member for retaining a back wheel of the bicycle to said transverse support member at one end portion thereof which is opposite to said end portion having said fork mount member, so that the fork of the bicycle is retained by the fork mount member, and the back wheel of said bicycle is retained at said one end portion of said transverse support member.

2. A bicycle rack in accordance with claim 1 wherein said fork mount members are attached to alternating end portions of adjacent transverse support members so that when a fork mount member is attached to the first end of a particular transverse support member, any transverse support member that is adjacent to said particular transverse support member will have a fork mount member attached to its second end.

3. A bicycle rack in accordance with claim 1 wherein the attachment means for attaching respective fork mount members to the transverse support members is also adapted to adjust the positions of said fork mount members so that the point of attachment can be adjusted back and forth along the transverse support members at selected spacings from the respective ends of the transverse support members.

4. A bicycle rack in accordance with claim 1 wherein there are first and second transverse support members attached to said central support member, with a first fork mount member attached to the first end of the first transverse support member and a second fork mount member attached to the second end of the second transverse support member.

5. A bicycle rack in accordance with claim 1 wherein there are first and second transverse support members attached to said central support member, with a first fork mount member attached to the first end of the first transverse support member and a second fork mount member attached to the first end of the second transverse support member.

6. A bicycle rack in accordance with claim 1 wherein the central support member comprises an elongate lateral member that extends backwardly a relatively short distance from the trailer hitch receiver so that a trailing end of said lateral member is positioned beyond the bumper of the transporting vehicle;

an elongate riser member that extends upwardly from the trailing end of the lateral member a relatively short distance so that an upper end of the riser member extends above a lower edge of the bumper of the transporting vehicle; and an elongate second lateral member that extends backwardly from the upper end of said riser member so that a longitudinal axis of the second lateral member is substantially parallel to a longitudinal axis of said elongate lateral member and wherein said elongate transverse support members are attached to the second lateral member.

7. A bicycle rack in accordance with claim 1 wherein said means for retaining the back wheel of the bicycle comprises at least two openings in each of said transverse support members and a strap for each of said transverse support members with the strap extending through at least one of the openings and encircling the back wheel of the bicycle for securely holding the back tire to the transverse support member at a desired, selected position.

8. A bicycle rack adapted to be cantilevered from a trailer hitch receiver at a rear end of a transporting vehicle, said bicycle rack comprising:

an elongate, central support member having a first end that is adapted to be received in said trailer hitch receiver, with the central support member extending rearwardly from the transporting vehicle;

at least two primary, elongate transverse support members having respective first and second ends, said primary transverse support members being attached to said central support member so that said primary transverse support members extend substantially transversely of the central support member and substantially parallel to the rear end of said transporting vehicle, said primary transverse support members being securely attached to said central support member at spaced apart positions on said central support member, with each of said primary transverse support members being attached to said central support member at a position in the central portion of said primary transverse support members;

a first, elongate, rigid, stabilizer member connected between and securely affixed to each of said primary transverse support members at a position closely adjacent to respective first ends of said primary transverse support members;

a second, elongate, rigid, stabilizer member connected between and securely affixed to each of said primary transverse support members at a position closely adjacent to respective second ends of said primary transverse support members;

a number of primary fork mount members equal to the number of primary transverse support members, with each of said primary fork mount members being attached to an end portion of a respective, primary transverse support member, said primary fork mount members being adapted to engage and securely hold a fork of a bicycle thereto after the front wheel of the bicycle has been removed from the fork of the bicycle;

means associated with each of said primary transverse support members for retaining a back wheel of the bicycle to said primary transverse support member at one end portion thereof which is opposite to said end portion having said primary fork mount member, so that the fork of the bicycle is retained by the primary fork mount member, and the back wheel of said bicycle is retained at said one end portion of said primary transverse support member;

said central support member is hollow and has an open distal end facing rearwardly from the transporting vehicle;

an elongate extension support member having first and second ends, with the first end of said elongate extension support member being telescopically attached to the distal end of said central support member for sliding, telescopic engagement with said distal end of said central support member so that the elongate extension support member extends rearwardly from the distal open end of said central support member;

means for releasably locking said first end of said extension support member in its position in which it is attached telescopically to the distal end of said central support member;

at least two secondary transverse support members having respective first and second ends, said secondary transverse support members being attached to said extension support member so that said secondary transverse support members extend transversely of the extension support member and substantially parallel to the rear end of said transporting vehicle, said secondary transverse support members being securely attached to said extension support member at spaced apart positions on said extension support member, with each of the said secondary transverse support members being attached to said extension support member at a position in the central portion of said secondary transverse support members;

a third, elongate, rigid, stabilizer member connected between and securely affixed to said secondary transverse support members at a position closely adjacent to respective first ends of said secondary transverse support members;

a fourth, elongate, rigid, stabilizer member connected between and securely affixed to said secondary transverse support members at a position closely adjacent to respective second ends of said secondary transverse support members;

a number of secondary fork mount members equal to the number of secondary transverse support members, with each of said secondary fork mount members being attached to an end portion of a respective, secondary transverse support member, said secondary fork mount members being adapted to engage and securely hold a fork of an additional bicycle thereto after the front wheel of the additional bicycle has been removed from the fork of the additional bicycle;

means associated with each of said secondary transverse support members for retaining a back wheel of said additional bicycle to said secondary transverse support member at one end portion thereof which is opposite to said end portion having said secondary fork mount member, so that the fork of said additional bicycle is retained by the secondary fork mount member, and the back wheel of said additional bicycle is retained at said one end of said secondary support member.

* * * * *